United States Patent [19]
Shiga

[11] Patent Number: 6,072,472
[45] Date of Patent: Jun. 6, 2000

[54] KEYBOARD WITH POWER SAVING FUNCTION AND DATA STORAGE CAPABILITIES

[75] Inventor: Sadakazu Shiga, Fukushima-ken, Japan

[73] Assignee: Alps Electric Co., Ltd., Japan

[21] Appl. No.: 08/857,607

[22] Filed: May 16, 1997

[30] Foreign Application Priority Data

May 28, 1996 [JP] Japan ................................. 8-133659

[51] Int. Cl.[7] ................................................ G09G 5/00
[52] U.S. Cl. ........................... 345/168; 345/172; 341/22; 341/26; 713/320
[58] Field of Search ...................... 345/168, 169, 345/172; 341/22, 26; 713/320, 321, 322, 323, 324

[56] References Cited

U.S. PATENT DOCUMENTS

| | | | |
|---|---|---|---|
| 4,527,917 | 7/1985 | Ueno | 400/70 |
| 4,680,572 | 7/1987 | Meguire et al. | 341/24 |
| 4,694,280 | 9/1987 | Rollhaus et al. | 341/26 |
| 5,331,337 | 7/1994 | Kabeya et al. | 345/172 |
| 5,371,693 | 12/1994 | Nakazoe | 364/707 |
| 5,384,721 | 1/1995 | Joto | 341/26 |
| 5,450,080 | 9/1995 | Irwin | 341/26 |
| 5,539,400 | 7/1996 | Mears | 341/22 |
| 5,684,471 | 11/1997 | Bernardi et al. | 340/825.72 |
| 5,818,437 | 10/1998 | Grover et al. | 345/326 |

FOREIGN PATENT DOCUMENTS 2-304611   12/1990   Japan.

*Primary Examiner*—Dennis-Doon Chow
*Assistant Examiner*—Amr Awad
*Attorney, Agent, or Firm*—Brinks Hofer Gilson & Lione

[57] ABSTRACT

A keyboard for reducing the power consumption of the controller when scanning the keys in the key matrix and/or transmitting the key codes of operated keys. The operation mode of the keyboard is switched from the normal mode to the stop mode to stop the operation of the clock signal generator and the operation of the controller including the generation of a scan signal for the key matrix when all keys arranged in the key matrix are held in the key-off state for longer than a predetermined period of time, for example five seconds, after any of the keys has been operated or when any of the keys in the key matrix has been keyed on and held in the key-on state for longer than a predetermined period of time, for example 60 seconds.

2 Claims, 4 Drawing Sheets

KEYBOARD WITH POWER SAVING
FUNCTION AND DATA STORAGE
CAPABILITIES

BACKGROUND OF THE INVENTION

The present invention relates to a keyboard and, more particularly, to a keyboard constituted, when transmitting data obtained by a keyboard operation to a host signal processor, to minimize power consumption in the keyboard.

Generally, a keyboard is used as connected to a signal processor such as a personal computer by cable and has a key matrix with many keys laid out, an input/output circuit for performing input/output operations with the key matrix, a controller for controlling the entire operation of the keyboard, a clock signal generator for forming a clock signal for obtaining a scan signal, a display device for indicating a key-operated state and so on, an interface circuit for providing interface between the keyboard and the signal processor, and a built-in power supply.

FIG. 4 shows a block diagram illustrating an example of the constitution of a known keyboard.

Referring to FIG. 4, a keyboard 40 comprises a key matrix 41 with many keys laid out, an input/output (I/O) circuit 42 for receiving data associated with key operations from the key matrix 41, a controller (CPU) 43 for controlling the entire operation of the keyboard 40, an interface (I/F) circuit 44 for providing interface between the keyboard 40 and the signal processor (not shown) such as a personal computer, an clock signal generator 45 for forming a clock signal for obtaining a signal for scanning the key matrix 41, a ROM 46 for storing a program for operating the controller 43, a RAM 47 for use in the data processing by the controller 43, and display device (IND) for indicating a key-operated state and so on, a cable 49 for connecting the interface circuit 44 to the signal processor, and a built-in power supply 50.

In the above-mentioned constitution, the controller 43 performs various operations as follows. First, the controller 43 generates a scan signal for scanning horizontally and vertically the keys arranged on the keyboard sequentially. Second, the controller 43 receives switch data corresponding to an operated key when the keys have been scanned. Third, the controller 43 converts the received switch data to a key code (or a keyboard code) to be transmitted to the signal processor. Fourth, the controller 43 transmits the switch code to the signal processor via the interface circuit 44 and the cable 49. Fifth, the controller 43 transmits required display data to the display device 48. Sixth, the controller 43 executes required signal processing in response to command data supplied from the signal processor via the cable 49.

The keyboard 40 having the above-mentioned constitution operates as follows in general.

When any of the keys arranged on the key matrix 41 is operated, the controller 43 sequentially receives the switch data corresponding to the operated keys via the input/output circuit 42. Then, the controller 43, based on the operating program stored in the ROM 46, converts the switch data to key codes by use of the RAM 47 and transmits sequentially the obtained key codes to the signal processor via the interface circuit 44 and the cable 49. If, during or immediately before or after this transmission, some command data are supplied from the signal processor to the controller 43, the controller 43 performs a control operation corresponding to that command data.

In the above-mentioned known keyboard 40, when the signal processor is in the active state, the scan signal is always supplied from the controller 43 to the key matrix 41 via the input/output circuit 42 for performing key scan on the keys arranged on the key matrix 41.

Also, in the above-mentioned known keyboard 40, every time any of the keys on the key matrix 41 are operated, the controller 43 generates key codes corresponding to the operated keys and transmits the generated key codes to the signal processor via the interface circuit 44 and the cable 49. Especially, when a single key is operated repeatedly, the controller 43 generates a corresponding key code repeatedly during the continuous operation and transmits the repeatedly generated key code to the signal processor without drop.

Thus, in the known keyboard 40, the controller 43 is always operating. This increases the availability of the controller 43, thereby posing a problem of increased power consumption of the controller 43. Especially, this problem becomes conspicuous when the keyboard is driven by the build-in battery 50.

SUMMARY OF THE INVENTION

It is therefore an object of the present invention to provide a keyboard that reduces the power consumption by the controller at the time of key scan on the key matrix and/or transmission of key codes.

In carrying out the invention and according to a first aspect thereof, there is provided a keyboard comprising: a key operation detecting section for detecting which of a plurality of arranged keys has been operated; a key operation interval detecting section for detecting that a period of time from detection of a key operation by the key operating detection to a following key detection has exceeded a predetermined period of time; and a key operation hold detecting section for detecting that a period of time from detection of a key operation by the key operation detecting section to a time at which the operating state of the operated key changes has exceeded a predetermined period of time; wherein, if the exceeding of the predetermined period time from detection of the operation of one key to detection of the operation of another key is detected by the key operation interval detecting section or if the exceeding of the predetermined period of time from detection of the operation of one key to detection of the change of the operation state of that key (to the non-operated state) is detected by the key operation hold detecting section, the keyboard enters a stop mode in which generation of a scan signal for sequentially scanning the plurality of arranged keys is stopped.

Preferably, in the above-mentioned first aspect, when the keyboard enters the stop mode, stop mode transition information is written to memory immediately before the transition.

In carrying out the invention and according to a second aspect thereof, there is provided a keyboard comprising: a key code generating section for generating a key code corresponding to an operated key of a plurality of arranged keys; and a key code transmitting section for transmitting the key code to a host signal processing unit; wherein the key code transmitting section, if more than one key of the plurality of arranged keys are sequentially operated consecutively, transmits collectively a plurality of key codes corresponding to the operated keys to the host signal processing unit.

In the above-mentioned second aspect, if the plurality of keys are sequentially operated consecutively, the key code transmitting section may also send the key code corresponding to the key operated first to the host signal processing unit immediately and the plurality of the key codes corresponding to the rest of the operated keys collectively to the host signal processing unit.

According to the first aspect of the invention, if no change occurs in the operated state of any key arranged in the key matrix after passing of the predetermined period of time, the operation mode of the keyboard is switched to the stop mode of low power consumption. This novel constitution reduces the power consumption of the keyboard in proportion to a period of time in which the stop mode is active; namely, the longer the keyboard is kept in the stop mode, the less the power is consumed.

According to the second aspect of the invention, if the plurality of keys are sequentially operated consecutively, the plurality of key codes corresponding to the operated keys are collectively transmitted to the host signal processing unit during the sequential operation. This novel constitution can reduce the power consumption of the keyboard as compared with the prior-art transmission in which key codes of the operated keys are transmitted separately.

In the second aspect of the invention, if only the key code corresponding to the key operated first is immediately transmitted to the host signal processing unit with the key codes of the rest of the operated keys collectively transmitted to the host signal processing unit, the feeling of uneasiness in operation caused by a delayed key operation can be eliminated while realizing the above-mentioned reduced power consumption.

The above and other objects, features and advantages of the present invention will become more apparent from the accompanying drawings, in which like reference numerals are used to identify the same or similar parts in several views.

DETAILED DESCRIPTION OF THE PREFERRED EMBODIMENT

This invention will be described in further detail by way of example with reference to the accompanying drawings.

Figure 1:
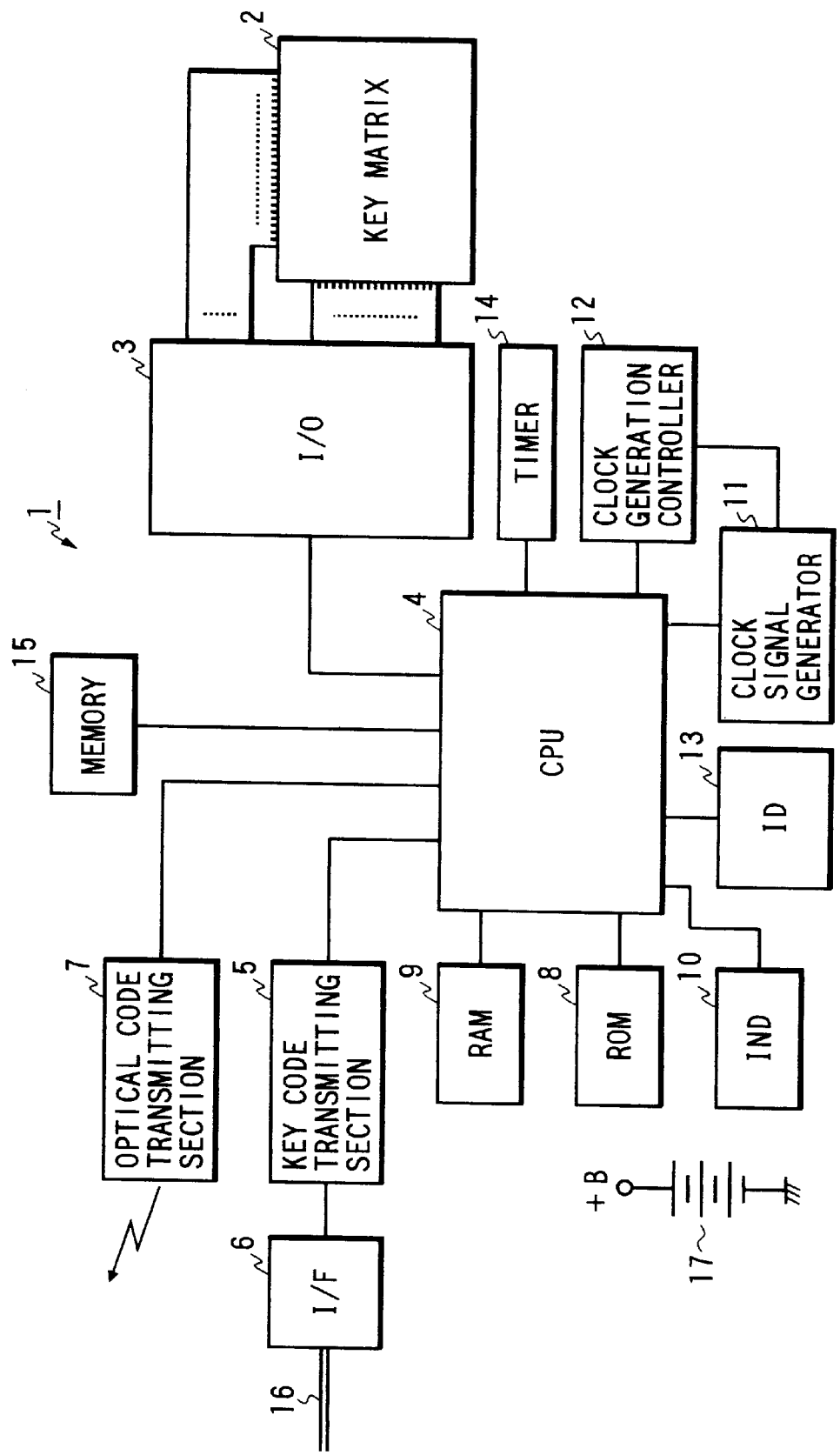
FIG. 1 is a block diagram illustrating the keyboard practiced as one preferred embodiment of the present invention.

FIG. 1 shows the block diagram of the keyboard practiced as one preferred embodiment of the invention.

As shown in the figure, a keyboard 1 comprises a key matrix 2, an input/output (I/O) circuit 3, a controller (CPU) 4, a key code transmitting section 5, an interface (I/F) circuit 6, an optical code transmitting section 7, a ROM 8, a RAM 9, a display device (IND) 10, a clock signal generator 11, a clock generation controller 12, an ID circuit 13, a timer 14, a memory 15, a cable 16, and a built-in power supply 17.

The key matrix 2 has many keys laid out therein and is scanned horizontally (X axis) and vertically (Y axis) by a scan signal supplied from the input/output circuit 3. The key code transmitting section 5 is connected at the input thereof to the controller 4 and at the output thereof to the input of the interface circuit 6. The output of the interface circuit 6 is connected to the cable 16. The optical code transmitting section 7 has a light emitting diode (not shown), the input thereof being connected to the controller 4. The ROM 8 and the RAM 9 are both connected to the controller 4. The timer 14 and the memory 15 are also connected to the controller 4. The display device 10 has one or more indicators made of a light emitting diode or the like and is connected to the controller 4. The clock generator 11 is connected at the output thereof to the controller 4 and at the control terminal thereof to the output of the clock generation controller 12. The input of the clock generation controller 12 is connected to the controller 4. The ID circuit 13 selects the ID unique to the keyboard 1 and is connected to the controller 4. The build-in power supply 17 supplies power to the controller 4 and so on, the output of the power supply being connected to the power supply terminal +B.

The following describes the operation of the keyboard 1 constituted as described above.

When the keyboard 1 is operating in the normal mode, the keys arranged in the key matrix 2 are always scanned horizontally (X) and vertically (Y) by a scan signal supplied from the controller 4 via the input/output circuit 3. At this moment, if any of the keys is operated, data indicating the type and operated state of the operated key is supplied to the controller 4 via the input/output circuit 3. The controller 4 converts the supplied data into a key code that indicates the type and the operated state (whether it was operated consecutively or in a one-shot manner) of the operated key and transmits the key code to the key code transmitting section 5 and the optical code transmitting section 7. The key code transmitting section 5 amplifies the received key code by a buffer amplifier (not shown) and supplies the amplified key code to the interface circuit 6. The interface circuit 6 sets the received key code to a key code to be interfaced with a host signal processing unit (not shown) such as a personal computer or the like and transmits the resultant key code to the host signal processing unit via the cable 16. On the other hand, the optical code transmitting section 7 amplifies the received key code by a buffer amplifier (not shown) and supplies the amplified key code to the light emitting diode, from which the key code is transmitted to the host signal processing unit as an optical signal. The controller 4 performs the above-mentioned operations as instructed by a operating program stored in the ROM 8 by use of the RAM 9, the operation of the controller 4 being shown on the display device 10 appropriately. It should be noted that the key code transmitted from the key code transmitting section 5 and the optical signal transmitted from the optical code transmitting section 7 are attached with the ID selected by the IC circuit 13 and unique to the keyboard 1.

If, in the normal mode, no key in the key matrix 2 has been operated (this is referred to as a key-off state) for five seconds after the last operation or the operation of any key in the key matrix 2 has continued (this is referred to as a key-on state) for 60 seconds, the keyboard 1 gets out of the normal mode into the stop mode.

Figure 2:
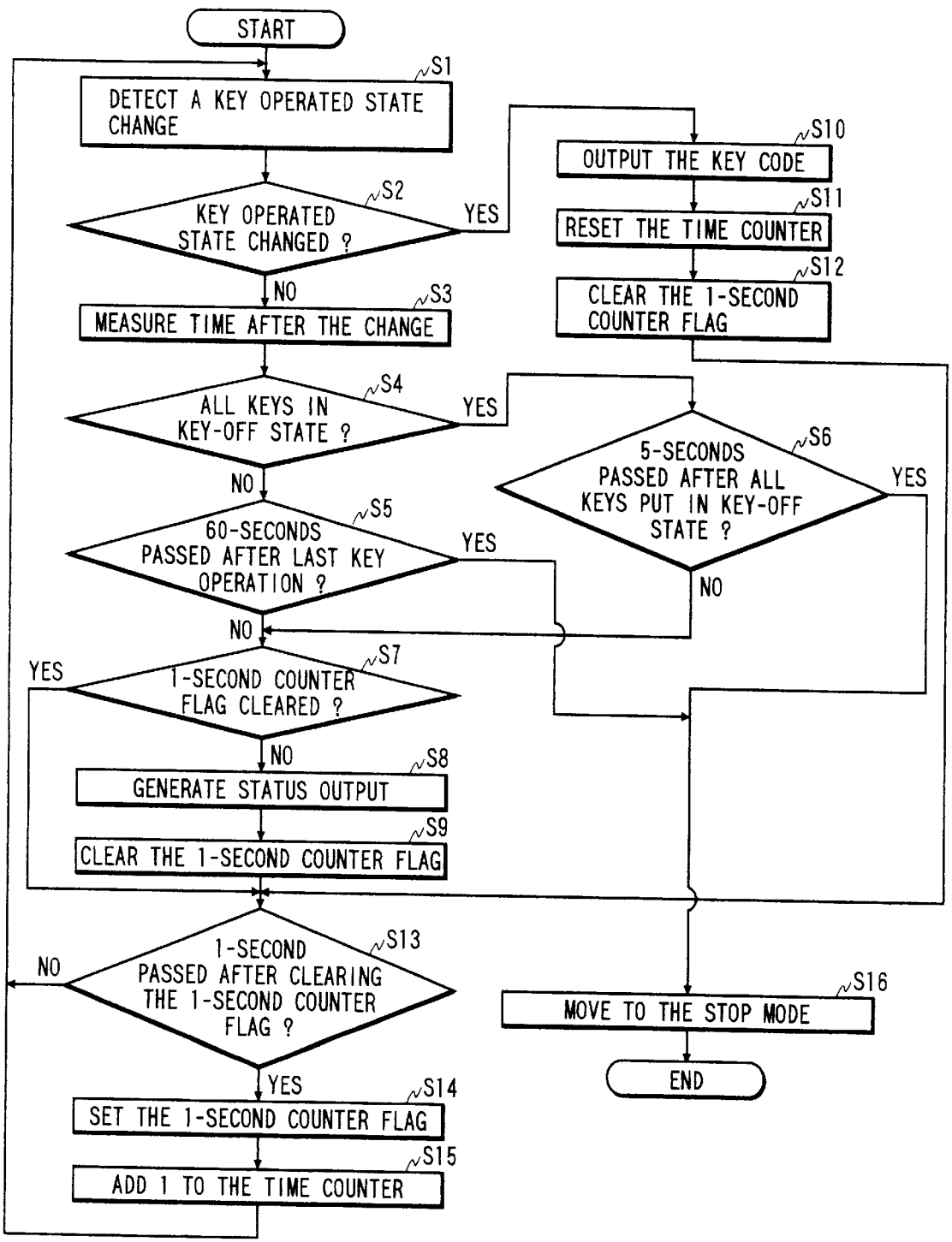
FIG. 2 is a flowchart indicating the process in which the operation mode of the embodiment of FIG. 1 is switched from the normal mode to the stop mode selectively.
Figure 3:
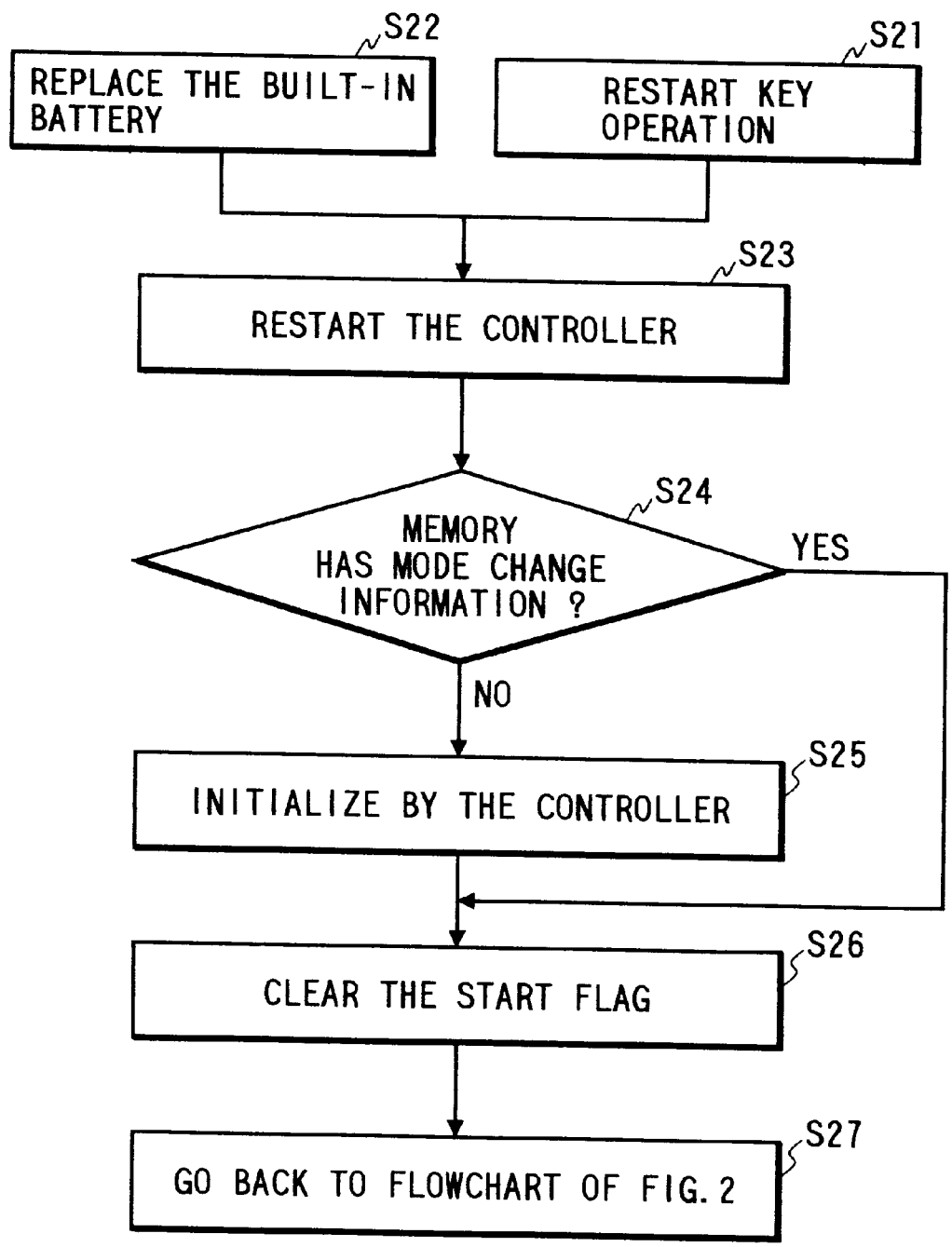
FIG. 3 is a flowchart indicating the process in which the operation mode of the embodiment of FIG. 1 is put back the stop mode into the normal mode.
Figure 4:
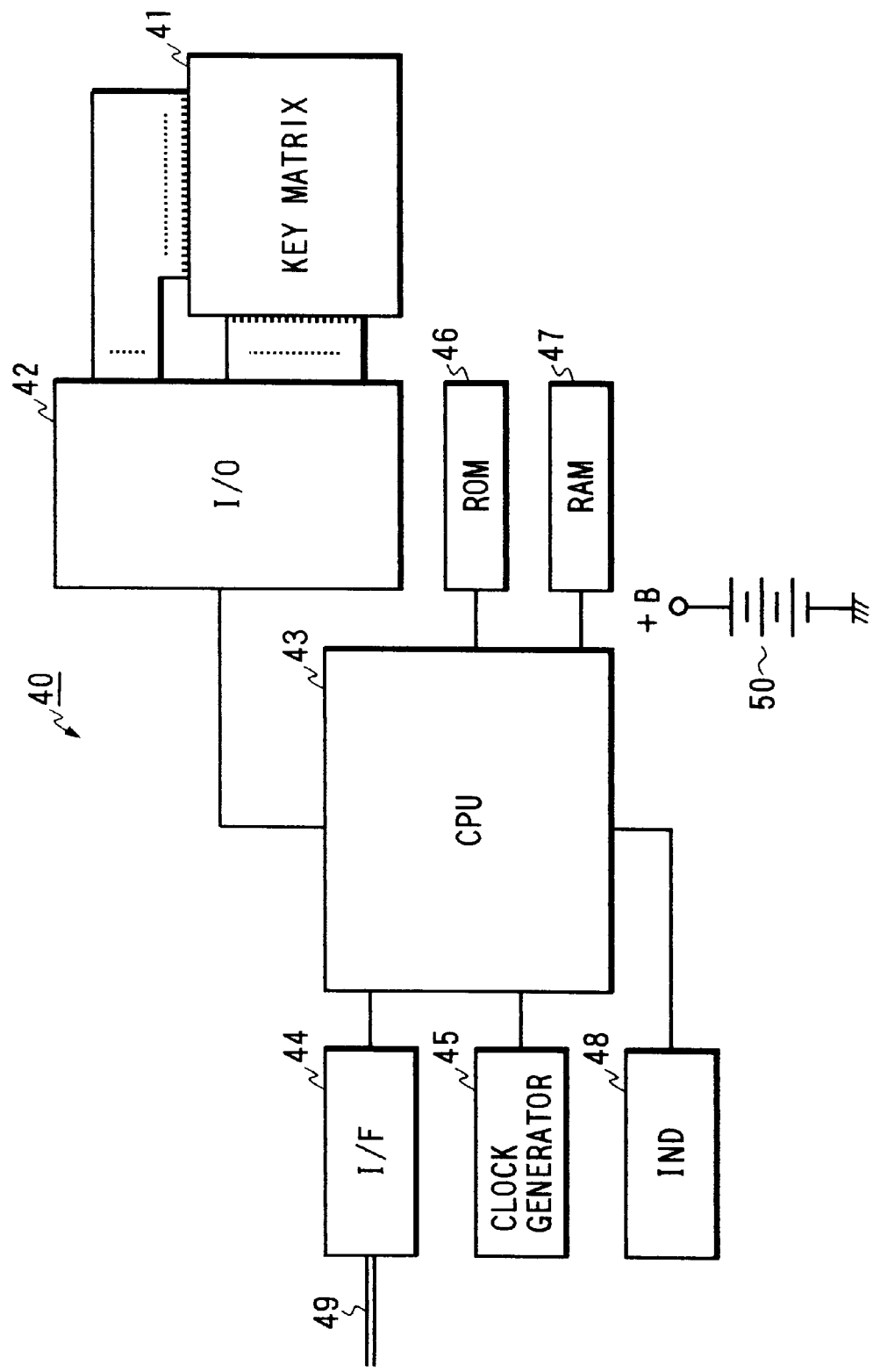
FIG. 4 is a block diagram illustrating the constitution of a known keyboard.

FIG. 2 shows a flowchart that describes the process in which the keyboard 1 operating in the normal mode is put in the stop mode selectively. FIG. 3 shows a flowchart that describes the process in which the keyboard 1 operating in the stop mode is put back into the normal mode.

The following describes the process of putting the keyboard 1 into the stop mode with reference to FIG. 2.

First, in step S1, the controller 4 detects the operation states (or a change in operation states) of the keys arranged in the key matrix 2.

In step S2, the controller 4 checks the operation states of the keys for a change. If no change has been found (N), the process goes to step S3. If the operation state of any key has been found changed (Y), the process goes to step S10.

In step S3, the controller 4 measures, by use of the timer 14, the elapsed time after the last change of key operation.

In step S4, the controller 4 determines whether all keys are in the key-off state or not. If any of the keys is found in the key-on state and all keys are not found in the key-off state (N), the process goes to step S5. If all keys are found in the key-off state (Y), the process goes to step S6.

In step S5, the controller 4 determines via the timer 14 whether 60 seconds have passed since the key in operation has been put in the key-on state. If 60 seconds have not yet passed (N), the process goes to step S7; if 60 seconds have passed (Y), the process goes to step S16.

In step S6, the controller 43 determines via the timer 14 whether five seconds have passed since all keys were put in the key-off state. If five seconds have not yet passed (N), the process goes to step S7; if five seconds have passed (Y), the process goes to step 16.

In step S7, the controller 4 determines whether a one-second counter has been cleared or not. If the one-second counter has not been cleared (N), the process goes to step S8; if the one-second counter has been cleared (or set) (Y), the process goes to step S13.

In step S8, the controller 4 generates a status output that indicates the key-on or key-off state of a function key.

In step S9, the controller 4 clears the one-second counter flag that is set.

In step S10, the controller 4 generates the key code corresponding to the key of which state has been found changed and transmits the generated key code to the key code transmitting section 5 and the optical code transmitting section 7.

Then, in step S11, the controller 4 resets the a time counter in the controller 4 to the count value of zero.

In step S12, the controller 4 clears the one-second counter flag that is set.

In step S13, the controller 4 determines via the timer 14 whether one second has passed since the one-second counter flag was cleared. If one second has passed (Y), the process goes to step S14; if one second has not passed (N), the process goes back to the first step S1 to repeat the above-mentioned operations.

In step S14, the controller 4 sets the one-counter flag.

In step S15, the controller 4 adds one to the time counter in the controller 4, upon which the process goes back to step S1 to repeat the above-mentioned operations.

In step S16, the controller 4 stops the clock generating operation of the clock signal generator 11 through the clock generation controller 12, upon which the supply of the scan signal to the key matrix 2 via the input/output circuit 3 is stopped, thereby putting the keyboard 1 into the stop mode. At this moment, the controller 4 writes mode change information that the keyboard enters the stop mode to the memory 15 and sets various conditions for restarting.

In this case, the power consumption of the keyboard 1 may be reduced also by stopping only the supply of the scan signal to the key matrix 2 without stopping the clock generating operation of the clock signal generator 11 when switching to the stop mode in step S16. It will be apparent that the power consumption of the keyboard 1 can be saved further if the clock generating operation and the supply of the scan signal to the key matrix 2 are both stopped.

The following describes the process in which the keyboard 1 returns from the stop mode to the normal mode with reference to FIG. 3.

First, in step S21, the controller 4 determines whether any of the keys arranged in the key matrix 2 has been put in the key-on state. If any of the keys has been found put in the key-on state, the process goes to step S23.

At the same time, in step S22, the controller 4 determines whether the built-in battery 17 of the keyboard 1 has been replaced making the keyboard 1 active. If the built-in battery has been found replaced making the keyboard active, the process also goes to step S23.

Then, if step S23, the controller 4 is restarted.

In step S24, the controller determines whether the mode change information is written to the memory 15. If no mode change information is found written (N), the process goes to the next step S25; if the mode change information is found written (Y), the process goes to step S26.

In step S25, the controller 4 initializes the ROM 8 and the RAM 9 as required.

In step S26, the controller 4 clears the start flag that is set to put the keyboard 1 into the normal mode without performing the initialization of step S25. Therefore, when switching the operation mode of the keyboard 1 from the stop mode to the normal mode, the mode change can be made faster than when switching from the stop mode to the normal mode after replacing the battery because no initialization is performed.

Then, in step S27, the keyboard 1 enters the operation mode describes in the flowchart of FIG. 2.

As described, according to the present embodiment, the operation mode of the keyboard 1 is switched from the normal mode to the stop mode to stop the operation of the clock signal generator 11 and the operation of the controller 4 including the generation of a scan signal for the key matrix 2 when all keys arranged in the key matrix 2 are held in the key-off state for longer than a first predetermined period of time (for example, five seconds) after any of the keys has been operated or when any of the keys in the key matrix 2 has been keyed on and held in the key-on state for longer than a second predetermined period of time (for example, 60 seconds). Therefore, the power consumption of the keyboard 1 can be significantly reduced in the stop mode, thereby providing an effective means for saving the consumption of the built-in battery 17 when the keyboard 1 is driven the same.

Before switching the operation mode of the keyboard 1 to the stop mode, the mode change information is written to the memory 15. Therefore, the controller 4 can be restarted according to the written mode change information.

In the present embodiment, if a plurality of keys in the key matrix 2 are sequentially keyed on consecutively, the key codes corresponding to these keys are temporarily stored in memory (not shown) during the sequential key operations. The stored key codes are collectively read a predetermined time interval, one second for example, to be transmitted to the host signal processing unit. Thus, the key codes of the sequentially operated keys are transmitted to the host signal processing unit collectively and intermittently (every second for example).

In this case, if a plurality of keys are sequentially keyed on consecutively as described above, only the key code for the key operated first may be transmitted to the host signal processing unit immediately after the operation, the key codes of the rest of the operated keys being temporarily stored in memory to be read later and transmitted to the host signal processing unit collectively and intermittently (every second for example).

Thus, in the present embodiment, the key codes for the plurality of keys operated sequentially and consecutively are transmitted to the host signal processing unit collectively, so that common data such as headers can be shared among the key codes, resulting in a reduced transmission power, which in turn reduces the power consumption of the keyboard 1 as compared with the prior-art constitution in which the key codes are transmitted to the host signal processing unit separately.

In addition, transmitting the key code of the first-operated key immediately after the operation eliminates the feeling of uneasiness in key operation caused by a delayed key operation.

Further, in the present embodiment, when repetitively transmitting the same key codes of a repetitively operated key to the host signal processing unit, only the first and last key codes are transmitted and the key codes in between are not transmitted. Therefore, the amount of the data to be transmitted to the host signal processing unit can be reduced, thereby saving the power consumption of the keyboard 1.

The present embodiment has been described as having the keyboard 1 that includes the key code transmitting section 5 and the optical code transmitting section 7, allowing the keyboard 1 to make transmission by both key code (keyboard code) and optical code. It will be apparent that the code transmission of the embodiment is not limited to these means; the keyboard may only be provided with the key code transmitting section 5 or the optical code transmitting section 7.

The present embodiment has been described with an example in which the condition of the transition from the normal mode to the stop mode is that all keys arranged in the key matrix 2 are held in the key-off state for longer than a predetermined period of time (for example, five seconds) after any of the keys has been operated or when any of the keys in the key matrix 2 has been keyed on and held in the key-on state for longer than a predetermined period of time (for example, 60 seconds). It will be apparent that the predetermined periods of time are not limited to these values; other periods of time may also be used if they are relatively near the above-mentioned predetermined periods of time.

As described and according to the invention, the operation mode of the keyboard is switched from the normal mode to the stop mode to stop the operation of the clock signal generator and the operation of the controller including the generation of a scan signal for the key matrix when all keys arranged in the key matrix are held in the key-off state for longer than a predetermined period of time after any of the keys has been operated or when any of the keys in the key matrix has been keyed on and held in the key-on state for longer than a predetermined period of time. Therefore, the power consumption of the keyboard can be significantly reduced in the stop mode.

Further, the key codes for the plurality of keys operated sequentially and consecutively are transmitted to the host signal processing unit collectively and intermittently, so that common data such as headers can be shared among the key codes, resulting in a reduced transmission power, which in turn reduces the power consumption of the keyboard as compared with the prior-art constitution in which the key codes are transmitted to the host signal processing unit separately.

Still further, when a plurality of keys are sequentially operated consecutively, the key code of the first-operated key is transmitted immediately after the operation to the host signal processing unit and the key codes of the rest of the operated keys are collectively and intermittently transmitted to the host signal processing unit, thereby eliminating the feeling of uneasiness in key operation caused by a delayed key operation.

While the preferred embodiment of the present invention has been described using specific terms, such description is for illustrative purposes only, and it is to be understood that changes and variations may be made without departing from the spirit or scope of the appended claims.

What is claimed is:

1. A keyboard comprising:

a key code generating section for generating a key code corresponding to an operated key of a plurality of laid-out keys;

a key code transmitting section for transmitting said key code to a host signal processing unit;

wherein said key code transmitting section, if more than one key of said plurality of laid-out keys are sequentially operated consecutively, transmits collectively a plurality of key codes corresponding to the operated keys to said host signal processing unit; and key codes corresponding to laid-out keys which are sequentially operated consecutively are temporarily stored in a memory, and a plurality of key codes are collectively read from the memory over a predetermined time interval, and are collectively and intermittently transmitted to a host signal processing unit;

when said plurality of key codes are transmitted to said host signal processing unit, the same data shared by said plurality of key codes is collectively transmitted; and wherein, if more than one key are sequentially operated consecutively, said key code transmitting section transmits immediately only a key code corresponding to a first-operated key of the operated keys to said host signal processing unit and transmits collectively the codes corresponding to the rest of the operated keys to said host signal processing unit.

2. The keyboard recited in claim 1, wherein said key code transmitted section supplies the key code to a light emitting diode and the light emitting diode transmits the key code to said host signal processing unit as an optical signal.

* * * * *